US012811129B2

(12) United States Patent
Chen et al.

(10) Patent No.: US 12,811,129 B2
(45) Date of Patent: Nov. 24, 2026

(54) PRELITHIATION DEVICE AND PRELITHIATION METHOD

(71) Applicant: CONTEMPORARY AMPEREX TECHNOLOGY CO., LIMITED, Ningde City (CN)

(72) Inventors: Shitong Chen, Ningde City (CN); Xinlu Fei, Ningde City (CN); Bin Xie, Ningde City (CN); Yongqiang Xu, Ningde City (CN); Keqiang Li, Ningde City (CN); Fenggang Zhao, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 165 days.

(21) Appl. No.: 18/530,930

(22) Filed: Dec. 6, 2023

(65) Prior Publication Data

US 2024/0105907 A1 Mar. 28, 2024

Related U.S. Application Data

(63) Continuation of application No. PCT/CN2022/099226, filed on Jun. 16, 2022.

(30) Foreign Application Priority Data

Jul. 30, 2021 (CN) ......................... 202110874277.7

(51) Int. Cl.
*H01M 4/04* (2006.01)
*H01M 4/139* (2010.01)

(52) U.S. Cl.
CPC ......... *H01M 4/0435* (2013.01); *H01M 4/139* (2013.01)

(58) Field of Classification Search
CPC .. B05C 1/083; B05C 9/04; B05C 9/08; B05C 9/10; B05C 9/12; B05C 9/14; B05C 9/02;
(Continued)

(56) References Cited

U.S. PATENT DOCUMENTS 12,381,199 B2 * 8/2025 Chen .................. H01M 4/0404

FOREIGN PATENT DOCUMENTS

CN 101715372 A * 5/2010 ........... B05C 1/0826
CN 203264960 U 11/2013
(Continued)

OTHER PUBLICATIONS

Machine translation of CN-207558931, Chen. (Year: 2018).*
(Continued)

*Primary Examiner* — Philip C Tucker
*Assistant Examiner* — Jimmy R Smith, Jr.
(74) *Attorney, Agent, or Firm* — Ladas & Parry, LLP

(57) ABSTRACT

A prelithiation device and a prelithiation method, are described. The prelithiation device comprises a first roller, a second roller, a third roller, and a first coating mechanism. The second roller is used to cooperate with the first roller to jointly roll a lithium ribbon to adhere the lithium ribbon to the second roller, the lithium ribbon comprising two first surfaces opposite each other in an axial direction of the second roller; the third roller is used to cooperate with the second roller to jointly roll an electrode plate to bond the lithium ribbon adhering to the second roller to the electrode plate; and the first coating mechanism is disposed upstream of the second roller and is configured to coat the first surfaces with a release agent.

12 Claims, 7 Drawing Sheets

(58) Field of Classification Search
CPC ........... H01M 10/0525; H01M 4/0435; H01M 4/044; H01M 4/0459; H01M 4/139; H01M 10/00; Y02E 60/10
See application file for complete search history.

(56) References Cited

FOREIGN PATENT DOCUMENTS

| | | | | |
|---|---|---|---|---|
| CN | 207558931 | U | * | 6/2018 |
| CN | 109762478 | A | | 5/2019 |
| CN | 110010844 | A | | 7/2019 |
| CN | 112310336 | A | | 2/2021 |
| CN | 112310342 | A | | 2/2021 |
| CN | 112838187 | A | | 5/2021 |
| CN | 217158294 | U | | 8/2022 |
| EP | 3 933 976 | A1 | | 1/2022 |
| EP | 3 955 334 | A1 | | 2/2022 |
| JP | 2001317541 | A | | 11/2001 |
| WO | 2021/012934 | A1 | | 1/2021 |
| WO | 2021/098539 | A1 | | 5/2021 |

OTHER PUBLICATIONS

Translation of CN-101715372-A, Zagar, May 2010.*
International Search Report dated Sep. 2, 2022 for Application No. PCT/CN2022/099226.
Written Opinion dated Sep. 2, 2022 for Application No. PCT/CN2022/099226.
First Chinese office action dated May 7, 2023 for Application No. CN 202110874277.7.
Notice of Grant dated Jul. 4, 2023 for Application No. CN 202110874277.7.
Extended European Search Report dated May 9, 2025 for application EP 22848090.1.

* cited by examiner

PRELITHIATION DEVICE AND PRELITHIATION METHOD

CROSS-REFERENCE TO RELATED APPLICATIONS

The present application is a continuation of International application PCT/CN2022/099226 filed on Jun. 16, 2022 that claims priority to Chinese patent application no. 202110874277.7, filed on Jul. 30, 2021. The subject matter of these applications is incorporated herein by reference in its entirety.

TECHNICAL FIELD

The present application relates to the technical field of battery manufacturing, and in particular to a prelithiation device and a prelithiation method.

BACKGROUND ART

Lithium-ion batteries are widely used in the fields of electric vehicles, consumer electronics, etc., because of their advantages such as high energy density and long service life. During the initial charge of a lithium-ion battery, some lithium will be consumed due to the formation of an SEI film (i.e., a solid electrolyte interface film), which will lead to the loss of lithium in a positive electrode material, reduce the battery capacity, and eventually reduce the efficiency of initial charge. In order to prevent the irreversible reduction of the battery capacity during the initial charge of the battery caused by lithium consumption, in the industry, a lithium ribbon is often bonded to the surface of an electrode plate by means of a press roller for prelithiation.

However, during prelithiation, safety risks such as smoking or even fire often occur.

SUMMARY OF THE INVENTION

An embodiment of the present application provides a prelithiation device and a prelithiation method. The prelithiation device can reduce safety risks, such as smoking or even fire, during prelithiation to improve the safety of battery production.

The present application is achieved by the following technical solutions.

According to a first aspect, an embodiment of the present application provides a prelithiation device, comprising: a first roller; a second roller for cooperating with the first roller to jointly roll a lithium ribbon to adhere the lithium ribbon to the second roller, the lithium ribbon comprising two first surfaces opposite each other in an axial direction of the second roller; a third roller for cooperating with the second roller to jointly roll an electrode plate to bond the lithium ribbon adhering to the second roller to the electrode plate; and a first coating mechanism disposed upstream of the second roller and configured to coat the first surfaces with a release agent.

With regard to the prelithiation device according to the embodiment of the present application, the first surfaces of the lithium ribbon are coated with the release agent, so that the release agent is provided on the extended portions of the lithium ribbon after rolling so as to facilitate adhesion of the lithium ribbon to the electrode plate during bonding and prevent the extended portions of the lithium ribbon from remaining on the second roller after the bonding and then sticking to the roller, which will cause safety risks such as smoking or even fire and also result in a poor prelithiation effect and a waste of a lot of lithium. The prelithiation device can reduce the safety risks, such as smoking or even fire, during prelithiation to improve the safety of battery production, and prevent the waste of lithium.

According to some embodiments of the present application, the prelithiation device comprises two first coating mechanisms configured to respectively coat the two first surfaces with the release agent.

In the above solution, the two first coating mechanisms respectively coat the two first surfaces with the release agent, which achieves a flexible coating operation to ensure that the release agent is provided on the extended portions on both sides of the lithium ribbon in a width direction, thereby ensuring the coating effect.

According to some embodiments of the present application, the two first coating mechanisms are disposed opposite each other in the axial direction of the second roller.

In the above solution, the two first coating mechanisms are disposed opposite each other, which achieves rational utilization of the installation space to ensure the balance of stress on two sides of the lithium ribbon in the axial direction of the second roller, and can also prevent interference with other components.

According to some embodiments of the present application, the first coating mechanism comprises a first coating roller and a first trough, the first trough being used to receive the release agent, the first coating roller being provided with a coating recess that is an annular recess circumferentially disposed around the first coating roller, and the first coating roller cooperating with the first trough in a running-fit to coat the first surfaces with the release agent in the first trough when the first coating roller rotates. In the above solution, the release agent in the first trough is transferred to the first surfaces through rotation of the first coating roller, which achieves flexible coating to ensure uniform coating of the release agent.

According to some embodiments of the present application, the prelithiation device further comprises an adjustment mechanism for adjusting the position of the first coating mechanism in the axial direction of the second roller.

In the above solution, the position of the first coating mechanism is adjusted by means of the adjustment mechanism, so as to prevent the first coating mechanism from interfering with the lithium ribbon and damaging the lithium ribbon.

According to some embodiments of the present application, the lithium ribbon further comprises a second surface facing the second roller, and the prelithiation device further comprises a second coating mechanism disposed upstream of the second roller and configured to coat the second surface with the release agent.

In the above solution, the second surface is coated with the release agent by means of the second coating mechanism, so that the lithium ribbon can easily adhere to the second roller and also easily adhere to the electrode plate from the second roller.

According to some embodiments of the present application, the second coating mechanism comprises a second coating roller and a second trough, the second trough being used to receive a release agent, and the second coating roller cooperating with the second trough in a running-fit to coat the second surface with the release agent when the second coating roller rotates.

In the above solution, the release agent in the second trough is transferred to the second surface through rotation of the second coating roller, which achieves flexible coating to ensure uniform coating of the release agent.

According to some embodiments of the present application, the second coating mechanism is located upstream or downstream of the first coating mechanism.

In the above solution, the first coating mechanism and the second coating mechanism are disposed in a staggered manner in the technological process, which achieves rational utilization of the installation space and can prevent interference between components.

According to some embodiments of the present application, the prelithiation device further comprises a detection mechanism located downstream of the first coating mechanism and the second coating mechanism and upstream of the second roller and used to detect the distribution of the release agent on the lithium ribbon; and a supplement mechanism for supplementing the release agent to the lithium ribbon according to a detection result of the detection mechanism.

In the above solution, the cooperation of the detection mechanism and the supplement mechanism can supplement the release agent to the region of the lithium ribbon lacking the release agent so as to ensure uniform distribution of the release agent on the lithium ribbon to ensure the coating effect.

According to some embodiments of the present application, the detection mechanism is used to detect the area of the region of the lithium ribbon that is not coated with the release agent, and the supplement mechanism is configured to supplement the release agent to the region of the lithium ribbon that is not coated with the release agent when the detection mechanism detects that the area of the region of the lithium ribbon that is not coated with the release agent is greater than a preset area.

In the above solution, the setting of the preset area can ensure the bonding effect and also improve the prelithiation efficiency.

According to some embodiments of the present application, the prelithiation device further comprises a prepressing mechanism disposed upstream of the first coating mechanism.

In the above solution, the lithium ribbon is rolled by the prepressing mechanism, which can ensure the thickness consistency of the lithium ribbon, and can also optimize the flatness of the surface of the lithium ribbon to facilitate uniform coating of the release agent on the lithium ribbon.

According to some embodiments of the present application, the prelithiation device further comprises a scraping mechanism, with the first roller, the third roller and the scraping mechanism being sequentially arranged in a direction of rotation of the second roller, and the scraping mechanism being configured to abut against a roller face of the second roller to remove residual lithium filings and residual release agent on the roller face of the second roller that are not completely transferred to a surface of the electrode plate; and a dust collection mechanism for removing the lithium filings and the release agent which are scraped off by the scraping mechanism.

In the above solution, the cooperation of the scraping mechanism and the dust collection mechanism can ensure that the roller face of the second roller is clean, and can also prevent the residual lithium filings and the residual release agent from entering the next step of rolling to avoid the safety problems, such as fire, due to friction between the lithium ribbon and the residues on the second roller, thereby improving the quality of the prelithiation process and improving the safety of the lithium ribbon production.

According to a second aspect, an embodiment of the present application further provides a prelithiation method, comprising: feeding a lithium ribbon between a first roller and a second roller, and rolling the lithium ribbon by means of the first roller and the second roller to adhere the lithium ribbon to the second roller, the lithium ribbon comprising two first surfaces opposite each other in an axial direction of the second roller; feeding an electrode plate between the second roller and a third roller, and rolling the lithium ribbon by means of the second roller and the third roller to bond the lithium ribbon adhering to the second roller to the electrode plate; and coating the first surfaces with a release agent by means of a first coating mechanism disposed upstream of the second roller.

In the prelithiation method according to the embodiment of the present application, the first surfaces are coated with the release agent, so that the release agent is provided on the extended portions of the lithium ribbon after rolling so as to prevent the extended portions of the lithium ribbon from adhering to the second roller after the lithium ribbon is bonded to the electrode plate, which will cause safety risks such as smoking or even fire and result in a poor prelithiation effect and a waste of a lot of lithium, thereby improving the safety of battery production and preventing the waste of lithium.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
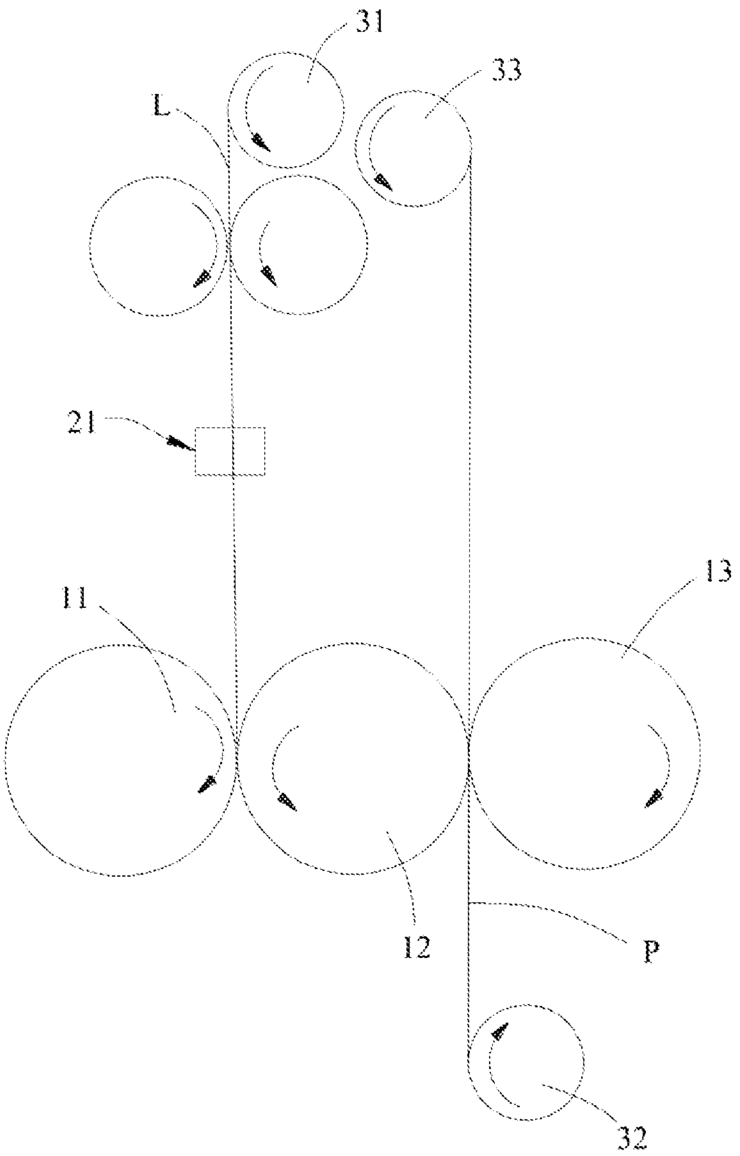
FIG. 1 is a schematic structural diagram of a prelithiation device according to an embodiment of the present application.

In the accompanying drawings, the figures are not drawn to scale.

LIST OF REFERENCE NUMERALS

11—first roller; 12—second roller; 13—third roller; 14—fourth roller; 21—first coating mechanism; 211—first coating roller; 2111—coating recess; 212—first trough; 22—second coating mechanism; 221—second coating roller; 222—second trough; 223—second scraper; 224—first back roller; 23—third coating mechanism; 31—lithium ribbon unwinding roller; 32—electrode plate unwinding roller; 33—electrode plate winding roller; 40—adjustment mechanism; 50—detection mechanism; 60—supplement mechanism; 70—prepressing mechanism; 71—first prepressing roller; 72—second prepressing roller; 80—traction mechanism; 81—traction roller; 82—traction belt; 91—scraping mechanism; 911—cleaning scraper; 92—dust collection mechanism; L—lithium ribbon; L1—first surface; L2—second surface; L3—third surface; and P—electrode plate.

DETAILED DESCRIPTION

In order to make the objectives, technical solutions and advantages of the embodiments of the present application clearer, the technical solutions of the embodiments of the present application will be described clearly and fully below in view of the specific embodiments of the present application and the corresponding drawings. Apparently, the described embodiments are merely some of the embodiments of the present application, rather than all the embodiments. Based on the embodiments of the present application, all other embodiments obtained by those of ordinary skill in the art without any creative effort fall within the scope of protection of the present application.

Unless otherwise defined, all technical and scientific terms used in the present application have the same meanings as those commonly understood by those skilled in the art to which the present application belongs; the terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in a relationship of "or".

In the present application, "a plurality of" means two or more (including two), and similarly, "a plurality of groups" means two or more groups (including two groups), and "a plurality of pieces" means two or more pieces (including two pieces).

A battery mentioned in the present application refers to a single physical module including one or more battery cells to provide a higher voltage and capacity. For example, the battery mentioned in the present application may comprise a battery module, a battery pack, etc.

The core member of a lithium-ion battery that can implement the repeated charge and discharge function is an electrode assembly in a battery cell. The electrode assembly comprises a positive electrode plate, a negative electrode plate, and a separator. The lithium-ion battery operates mainly by the movement of lithium ions between the positive electrode plate and the negative electrode plate.

The positive electrode plate comprises a positive electrode current collector and a positive electrode active material layer applied to a surface of the positive electrode current collector, and the current collector not coated with the positive electrode active material layer protrudes from the current collector coated with the positive electrode active material layer and serves as a positive electrode tab. Generally, in the lithium-ion battery, the positive electrode current collector may be aluminum foil, and the positive electrode active material layer may be ternary lithium, lithium manganate, lithium cobaltate or lithium iron phosphate, etc.

The negative electrode plate comprises a negative electrode current collector and a negative electrode active material layer applied to a surface of the negative electrode current collector, and the current collector not coated with the negative electrode active material layer protrudes from the current collector coated with the negative electrode active material layer and serves as a negative electrode tab. Generally, in the lithium-ion battery, the negative electrode current collector may be copper foil, and the negative electrode active material layer may be carbon or silicon, etc.

The lithium-ion battery forms a solid electrolyte interface film during the initial charge and discharge process, and the solid electrolyte interface film will consume some lithium, resulting in the loss of lithium, and this irreversible initial capacity loss directly leads to a capacity loss of the lithium-ion battery. In order to reduce the decrease in battery capacity caused by the irreversible capacity loss of the battery during the initial charge and discharge process, it is desired to supplement active lithium onto the active material layer of the electrode plate in advance during forming of the electrode plate.

At present, a prelithiation device is generally used for coating the surface of the electrode plate with lithium to reduce the irreversible reduction of the capacity of the lithium-ion battery during the initial charge and discharge process and thus improve the capacity and cycle life of the lithium-ion battery. The prelithiation process for the electrode plate mainly includes a rolling process and a bonding process. In the rolling process, a lithium ribbon is thinned by rolling to form a lithium film, and in the bonding process, the lithium film is bonded to the surface of the electrode plate by rolling. It should be noted that for ease of subsequent description, the lithium film in essence is also named after the lithium ribbon. The inventor has found that safety risks, such as smoking or even fire, often occur when a lithium ribbon is bonded to an electrode plate by a prelithiation device by means of a bonding process. After research, the inventor has found that smoking or even fire during prelithiation is for the reason that the lithium ribbon sticks to a roller surface, the temperature of the lithium ribbon adhering to the roller increases under squeezing and friction by the rollers, and then smoking and fire occur. It should be noted that sticking to the roller means that the lithium ribbon adheres to the surface of the roller.

To overcome the sticking of the lithium ribbon to the roller, the inventor coated a release agent on the surface of the lithium ribbon facing the roller to facilitate the separation of the lithium ribbon from the roller. However, the inventor has found that smoking and fire still exist. Therefore, the inventor has made a detailed study and has found that the sticking of the lithium ribbon to the roller is for the reason that the lithium ribbon extends during rolling, and the extended portions of the lithium ribbon adhere to the surface of the roller due to the lack of the release agent and do not bond to the electrode plate, which results in a poor prelithiation effect and a waste of a lot of lithium and also causes safety risks such as smoking or even fire.

In view of this, the present application provides a technical solution in which, before the lithium ribbon is rolled and bonded, two first surfaces of the lithium ribbon opposite each other in an axial direction of a second roller are coated with a release agent by means of a first coating mechanism so that, when the lithium ribbon is rolled, the thickness of the lithium ribbon becomes smaller, the lithium ribbon extends to two sides in a width direction thereof, and the release agent on the first surfaces flows on the surface of the lithium ribbon, so that the release agent can be provided on the extended portions of the lithium ribbon after rolling, so as to prevent the extended portions of the lithium ribbon from still adhering to the second roller after the bonding and thus sticking to the roller, which will cause safety risks such as smoking or even fire and also result in a poor prelithiation effect and a waste of a lot of lithium. The prelithiation device can reduce the safety risks, such as smoking or even fire, during prelithiation to improve the safety of battery production, and prevent the waste of lithium.

Figure 2:
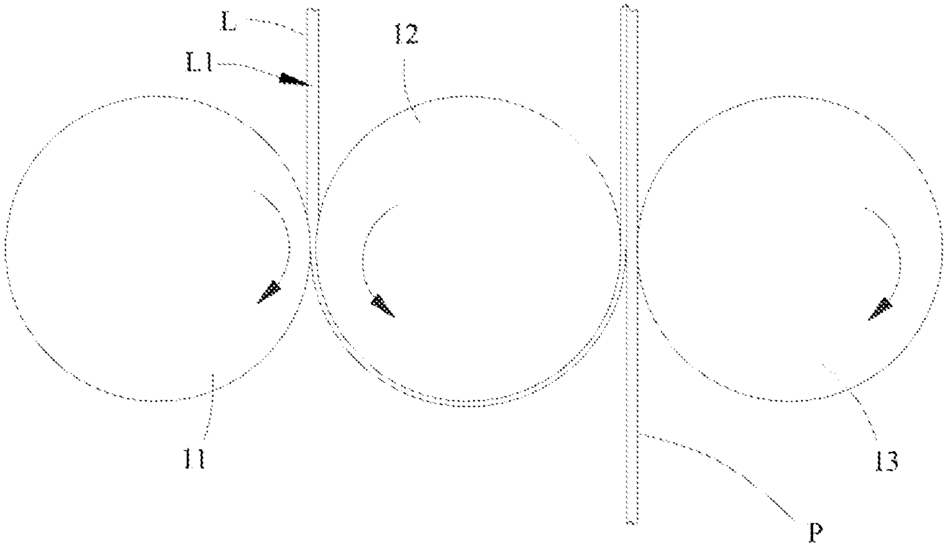
FIG. 2 is a schematic diagram of an operating principle of rolling and bonding for the lithium ribbon in FIG. 1.

FIG. 1 shows a schematic structural diagram of a prelithiation device according to an embodiment of the present application; and FIG. 2 is a schematic diagram of an operating principle of rolling and bonding for the lithium ribbon in FIG. 1.

As shown in FIGS. 1 and 2, the prelithiation device according to the embodiment of the present application comprises a first roller 11, a second roller 12, a third roller 13, and a first coating mechanism 21. The prelithiation device generally further comprises a lithium ribbon unwinding roller 31, an electrode plate unwinding roller 32, and an electrode plate winding roller 33.

The lithium ribbon unwinding roller 31 is a base for arrangement of a lithium ribbon L, and is used to unwind the lithium ribbon L. The lithium ribbon L may be disposed on the lithium ribbon unwinding roller 31 in a winding manner, and when the lithium ribbon unwinding roller 31 unwinds the lithium ribbon L, the lithium ribbon L can be supplied between the first roller 11 and the second roller 12.

The electrode plate unwinding roller 32 is a base for arrangement of an electrode plate P, and is used to unwind the electrode plate P. The electrode plate P may be disposed on the electrode plate unwinding roller 32 in a winding manner, and when the electrode plate unwinding roller 32 unwinds the electrode plate P, the electrode plate P can be supplied between the second roller 12 and the third roller 13.

The electrode plate winding roller 33 is a base for arrangement of an electrode plate P, and is used to wind the lithium-coated electrode plate P. The lithium-coated electrode plate P may be wound on the electrode plate winding roller 33 in a winding manner.

The first roller 11 and the second roller 12 are used to implement the rolling process in the prelithiation technology, and the second roller 12 is used to cooperate with the first roller 11 to jointly roll the lithium ribbon L to adhere the lithium ribbon L to the second roller 12. The second roller 12 and the third roller 13 are used to implement the bonding process in the prelithiation technology, and the third roller 13 is used to cooperate with the second roller 12 to jointly roll the electrode plate P to bond the lithium ribbon L adhering to the second roller 12 to the electrode plate P.

Specifically, as shown in FIG. 2, the first roller 11 and the second roller 12 are adjacent to and opposite each other, and after the lithium ribbon L is fed between the first roller 11 and the second roller 12, the first roller 11 and the second roller 12 may cooperate with each other to implement the function of rolling the lithium ribbon L; and the second roller 12 and the third roller 13 are adjacent to and opposite each other, and after the electrode plate P is fed between the second roller 12 and the third roller 13, the second roller 12 and the third roller 13 may cooperate with each other to implement the function of bonding of the lithium ribbon L and the electrode plate P. It should be noted that the direction of rotation of the first roller 11 is opposite to that of the second roller 12, and the direction of rotation of the second roller 12 is opposite to that of the third roller 13, so as to facilitate the running of the lithium ribbon L and the electrode plate P.

The lithium ribbon L has certain plasticity. The lithium ribbon L is located in a roller gap between the first roller 11 and the second roller 12 when being fed between the first roller 11 and the second roller 12, and the lithium ribbon L extends by rolling to form a film-like structure with a certain thickness, which is conducive to bonding of the lithium ribbon to the surface of the electrode plate P in a subsequent bonding process. Certainly, the roller gap between the first roller 11 and the second roller 12 should be smaller than the thickness of the lithium ribbon L, so that the lithium ribbon L can be rolled and the lithium ribbon L can adhere to the roller face of the second roller 12 under pressure. The direction of rotation of the first roller 11 is opposite to that of the second roller 12 to facilitate running of the lithium ribbon L.

With the rotation of the second roller 12, the lithium ribbon L on the second roller 12 is fed between the second roller 12 and the third roller 13, and since the electrode plate P is fed between the second roller 12 and the third roller 13, the lithium ribbon L and the electrode plate P are simultaneously located in a roller gap between the second roller 12 and the third roller 13. Due to large surface roughness of the electrode plate P, the adhesive force between the lithium ribbon L and the electrode plate P is greater than that between the lithium ribbon L and the roller face of the second roller 12, so that when the lithium ribbon L and the electrode plate P are in contact with each other and are rolled, the lithium ribbon L adheres to the electrode plate P, and as the electrode plate P is conveyed, the electrode plate P pulls the lithium ribbon L and drive the lithium ribbon L to peel off from the roller face of the second roller 12, thus coating the electrode plate P with lithium, that is, the lithium ribbon L adhering to the roller face of the second roller 12 is bonded to the surface of the electrode plate P, thus implementing the prelithiation process for the electrode plate P.

In order to meet requirements for prelithiation under different operation conditions, the prelithiation device may comprise a gap control mechanism (not shown). The gap control mechanism is used to adjust the roller gap between the first roller 11 and the second roller 12 and the roller gap between the second roller 12 and the third roller 13 to regulate the rolling effect of the first roller 11 and the second roller 12 and the bonding effect of the second roller 12 and the third roller 13 by means of the adjustment of the roller gaps, so as to meet different requirements for the prelithiation process.

In the embodiment of the present application, the specific arrangement of the first roller 11, the second roller 12 and the third roller 13 is not limited. For example, the first roller 11, the second roller 12 and the third roller 13 may be sequentially arranged in a horizontal direction. For another example, the first roller 11, the second roller 12 and the third roller 13 may also be sequentially arranged in a vertical direction. For still another example, the first roller 11, the second roller 12 and the third roller 13 may also be arranged in a nonlinear shape, such as a triangle or an L-shape. It should be noted that the specific arrangement of the first roller 11, the second roller 12 and the third roller 13 may be determined according to the operation condition requirements matched for the prelithiation device.

The lithium ribbon L comprises two first surfaces L1 opposite each other in an axial direction of the second roller 12 (as shown in FIG. 2). In order to facilitate the rolling on the lithium ribbon L, the second roller 12 is disposed in a width direction of the lithium ribbon L. That is, the two first surfaces L1 of the lithium ribbon L are two surfaces of the lithium ribbon L opposite each other in the width direction.

In the embodiment of the present application, as shown in FIG. 1, the first coating mechanism 21 is disposed upstream of the second roller 12, and the first coating mechanism 21 is configured to coat the first surfaces L1 (see FIG. 2) of the lithium ribbon L with a release agent. That is, when the lithium ribbon L moves to a position corresponding to the first coating mechanism 21, the first coating mechanism 21 coats the first surfaces L1 with the release agent, then the lithium ribbon L having the first surfaces L1 coated with the release agent moves between the second roller 12 and the first roller 11, and the lithium ribbon L is rolled at the second roller 12 and the first roller 11. It should be noted that upstream and downstream are two relative terms, and refer to the relationship of sequence in a process. Taking the first coating mechanism 21 being disposed upstream of the second roller 12 as an example, the lithium ribbon L first passes across the first coating mechanism 21 and then passes across the second roller 12 during running, that is, the second roller 12 is located downstream of the first coating mechanism 21. The relationship of positions of the first coating mechanism 21 and the second roller 12 is the relationship in sequence in the prelithiation process.

In the prelithiation device according to the embodiment of the present application, the first surfaces L1 of the lithium ribbon L is coated with the release agent, so that when the lithium ribbon L is rolled, as the lithium ribbon L extends in the width direction thereof, the release agent on the first surfaces L1 flows on the surface of the lithium ribbon L, so that the release agent can be provided on the extended portions of the lithium ribbon L after the rolling, so as to prevent the lithium ribbon L from remaining on the second roller 12 due to the failure to adhere to the electrode plate P from the second roller 12 during bonding, which will cause safety risks such as smoking or even fire and also result in a poor prelithiation effect and a waste of a lot of lithium. The prelithiation device can reduce the safety risks, such as smoking or even fire, during prelithiation to improve the safety of battery production, and prevent the waste of lithium.

Figure 3:
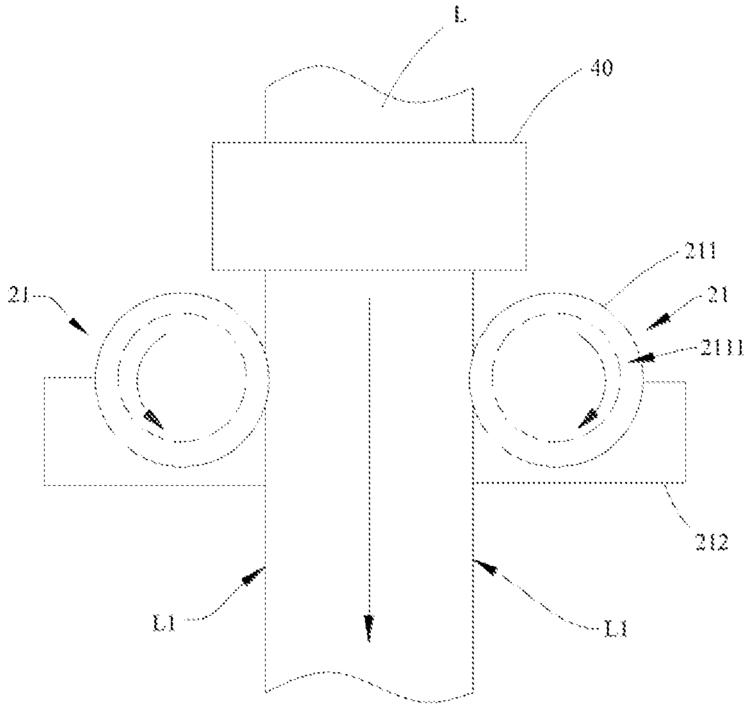
FIG. 3 is a schematic diagram of a first coating mechanism in cooperation with a lithium ribbon according to an embodiment of the present application.

FIG. 3 shows a schematic diagram of a first coating mechanism 21 in cooperation with a lithium ribbon L according to an embodiment of the present application. According to some embodiments of the present application, as shown in FIG. 3, the prelithiation device comprises two first coating mechanisms 21, and the two first coating mechanisms 21 are configured to respectively coat the two first surfaces L1 with the release agent, that is, one first coating mechanism 21 corresponds to one first surface L1. The two first coating mechanisms 21 respectively coat the two first surfaces L1 with the release agent, which achieves a flexible coating operation to ensure that the release agent is provided on the extended portions on both sides of the lithium ribbon L in a width direction, thereby ensuring the coating effect.

When the prelithiation device comprises the two first coating mechanisms 21, the two first coating mechanisms 21 are disposed opposite each other in the axial direction of the second roller 12. That is, as shown in FIG. 3, the two first coating mechanisms 21 are disposed opposite each other in the width direction of the lithium ribbon L, and the two first coating mechanisms 21 respectively coat the two first surfaces L1 with the release agent on two sides of the lithium ribbon L in the width direction. The two first coating mechanisms 21 are disposed opposite each other, which achieves rational utilization of the installation space to ensure the balance of stress on two sides of the lithium ribbon L in the axial direction of the second roller 12, and can also prevent interference with other components.

According to some other embodiments of the present application, the prelithiation device may also comprise only one first coating mechanism 21, and the two first surfaces L1 are coated with the release agent by means of one first coating mechanism 21 to ensure that the release agent is provided on the extended portions on both sides of the lithium ribbon L in the width direction.

Figure 4:
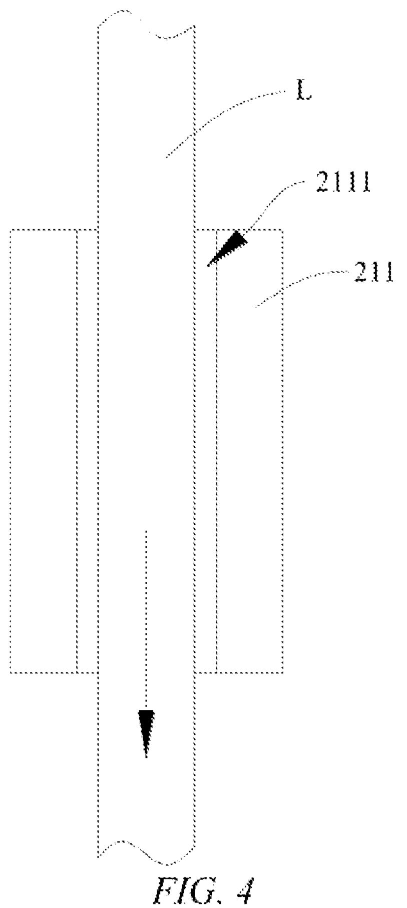
FIG. 4 is a schematic structural diagram of a first coating roller when in cooperation with a lithium ribbon according to an embodiment of the present application from one perspective.
Figure 5:
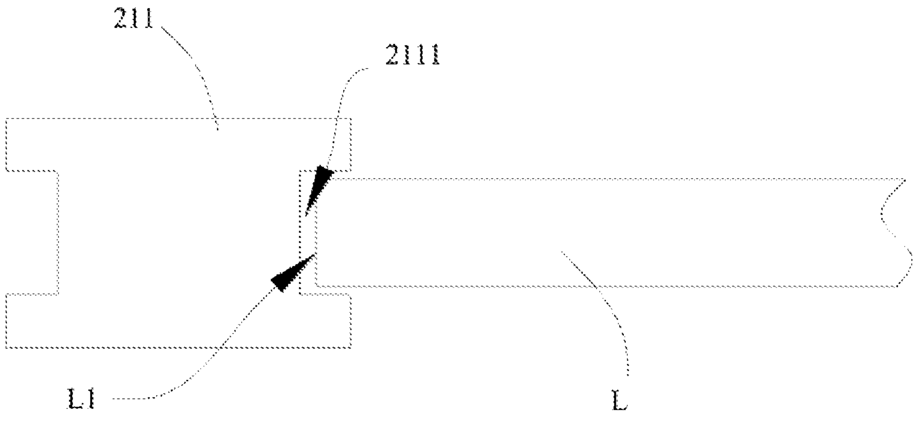
FIG. 5 is a schematic structural diagram of a first coating roller when in cooperation with a lithium ribbon according to an embodiment of the present application from another perspective.

According to some embodiments of the present application, as shown in FIG. 3, the first coating mechanism 21 comprises a first coating roller 211 and a first trough 212, the first trough 212 being used to receive a release agent. FIG. 4 shows a schematic structural diagram of a first coating roller 211 when in cooperation with a lithium ribbon L according to an embodiment of the present application from one perspective. FIG. 5 is a schematic structural diagram of a first coating roller 211 when in cooperation with a lithium ribbon L according to an embodiment of the present application from another perspective. As shown in FIGS. 4 and 5, the first coating roller 211 is provided with a coating recess 2111, the coating recess 2111 is an annular recess circumferentially disposed around the first coating roller 211, and the first coating roller 211 cooperates with the first trough 212 in a running-fit to coat the first surfaces L1 with the release agent in the first trough 212 when the first coating roller 211 rotates. That is, when the first coating roller 211 rotates relative to the first trough 212, the release agent in the first trough 212 is transferred to the roller face (the surface of the annular recess) of the first coating roller 211, the roller face of the first coating roller 211 is in contact with the first surfaces L1, and the first surfaces L1 are coated with the release agent on the roller face of the first coating roller 211 upon contact. In other words, the first coating mechanism 21 coats the first surfaces L1 of the lithium ribbon L with the release agent by means of transfer coating. The release agent in the first trough 212 is transferred to the first surfaces L1 through rotation of the first coating roller 211, which achieves flexible coating to ensure uniform coating of the release agent.

It should be noted that the size of the coating recess 2111 in a thickness direction of the lithium ribbon L is greater than the thickness of the lithium ribbon L, so that the first surfaces L1 can be received in the coating recess 2111 to ensure that the first surfaces L1 are coated with the release agent through rotation of the first coating roller 211.

The cross-section of the coating recess 2111 may be in any suitable shape, and for example, may be rectangular, trapezoidal, etc.

In other embodiments of the present application, the first coating mechanism 21 may also coat the release agent by means of extrusion transfer coating or screen printing coating, etc., which will not be described in detail in the present application.

In order to control the thickness of the release agent on the first coating roller 211 to ensure the thickness of the release agent coating to the first surfaces L1, the first coating mechanism 21 further comprises a first scraper (not shown) disposed in the first trough 212. In the direction of rotation of the first coating roller 211, the first coating roller 211 first comes into contact with the release agent in the first trough 212, then the first scraper and the first coating roller 211 cooperatively control the thickness of the release agent on the first coating roller 211, and as the first coating roller 211 rotates, the release agent with the consistent thickness on the first coating roller 211 is transferred to the first surfaces L1 of the lithium ribbon L.

According to some embodiments of the present application, as shown in FIG. 3, the prelithiation device further comprises an adjustment mechanism 40. The adjustment mechanism 40 is used to adjust the position of the first coating mechanism 21 in the axial direction of the second roller 12 (see FIG. 1), the axial direction of the second roller 12 being the width direction of the lithium ribbon L. That is, the adjustment mechanism 40 is used to adjust the position of the first coating mechanism 21 in the width direction of the lithium ribbon L. The position of the first coating mechanism 21 is adjusted by means of the adjustment mechanism 40, so as to prevent the lithium ribbon L from being damaged due to the interference between the lithium ribbon L and the first coating mechanism 21.

For example, when two first coating mechanisms 21 are provided, and the two first coating mechanism 21 are disposed opposite each other in the axial direction of the second roller 12, the lithium ribbon L is located between the two first coating mechanisms 21. If the lithium ribbon L is offset during running, that is, the position of the lithium ribbon L in the axial direction of the second roller 12 is offset, the lithium ribbon L is likely to interfere with the first coating mechanism 21 on the offset side to cause damage of the lithium ribbon L. In addition, the distance between the first coating mechanism 21 on the other side and the lithium ribbon L increases, resulting in reduction in the amount of the release agent coated on the first surface L1 on this side or even no release agent coating thereon. Controlling the position of the first coating mechanism 21 by means of the adjustment mechanism 40 can adapt to the running of the lithium ribbon L and ensure that the two first coating mechanisms 21 have the same distance from the lithium ribbon L when the position of the lithium ribbon L is offset, which can not only prevent the lithium ribbon L from interfering with the first coating mechanisms 21, but also ensure that the two first surfaces L1 of the lithium ribbon L can be uniformly coated with the release agent.

Figure 6:
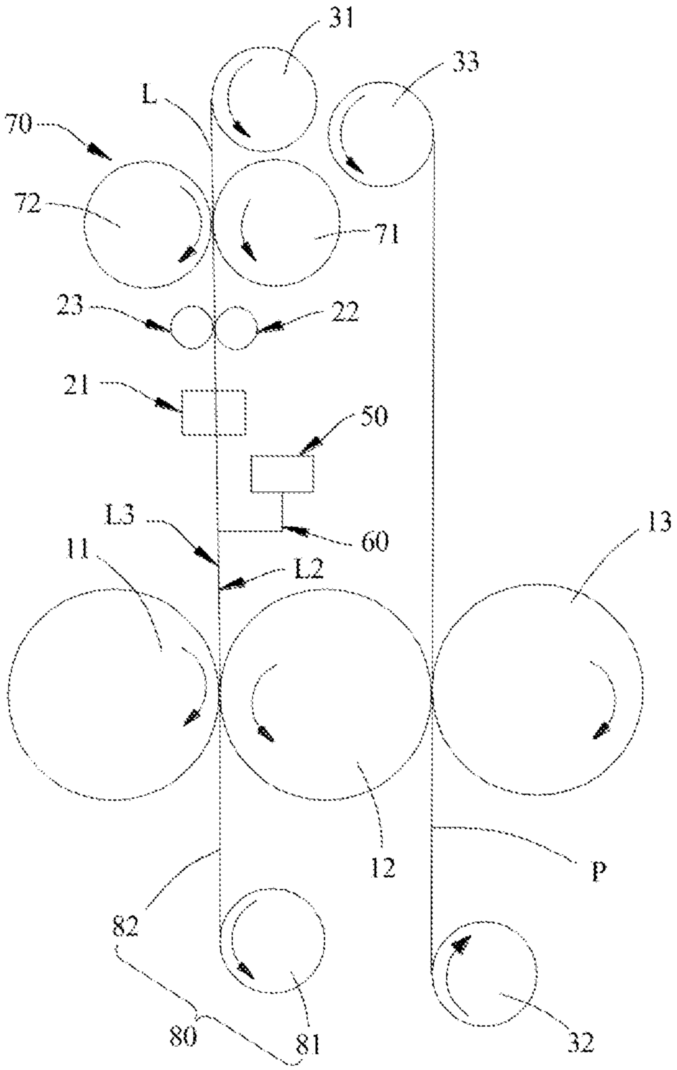
FIG. 6 is a schematic structural diagram of a prelithiation device according to an embodiment of the present application when a lithium ribbon is fed between a first roller and a second roller.

FIG. 6 is a schematic structural diagram of a prelithiation device according to an embodiment of the present application when a lithium ribbon L is fed between a first roller 11 and a second roller 12. According to some embodiments of the present application, as shown in FIG. 6, the prelithiation device further comprises a prepressing mechanism 70, the prepressing mechanism 70 being disposed upstream of the first coating mechanism 21. That is, the lithium ribbon L is first prepressed by means of the prepressing mechanism 70 and then passes across the first coating mechanism 21. The prepressing mechanism 70 rolls the lithium ribbon L, which can ensure the thickness consistency of the lithium ribbon L, and can also optimize the flatness of the surface of the lithium ribbon L to facilitate uniform coating of the release agent on the lithium ribbon L.

As shown in FIG. 6, the prepressing mechanism 70 comprises a first prepressing roller 71 and a second prepressing roller 72, and the lithium ribbon L passes between the first prepressing roller 71 and the second prepressing roller 72. The first prepressing roller 71 and the second prepressing roller 72 are used to pre-roll the lithium ribbon L to improve the thickness consistency of the lithium ribbon L, so as to significantly improve the effect of coating the surface of the lithium ribbon L with the release agent. The thickness consistency of the lithium ribbon L is associated with manufacturing costs, and reducing the requirement for the thickness consistency of the lithium ribbon L can reduce the cost of incoming material of the lithium ribbon L.

Under the rolling action of the prepressing mechanism 70, the amount of compression of the lithium ribbon L is 10% to 20%. Since the lithium ribbon L has a small amount of compression, it is not likely to adhere to the first prepressing roller 71 and the second prepressing roller 72. The first prepressing roller 71 and the second prepressing roller 72 may be disposed upstream of the first coating mechanism 21.

According to some embodiments of the present application, as shown in FIG. 6, the lithium ribbon L further comprises a second surface L2 facing the second roller 12, and the prelithiation device may further comprise a second coating mechanism 22, the second coating mechanism 22 being disposed upstream of the second roller 12, and the second coating mechanism 22 being configured to coat the second surface L2 with the release agent. Coating the second surface L2 with the release agent by means of the second coating mechanism 22 can reduce the adhesive force between the second surface L2 and the roller face of the second roller 12, so that the lithium ribbon L on the second roller 12 can be bonded to the electrode plate P when the second roller 12 and the third roller 13 roll the electrode plate P.

In this way, before the lithium ribbon L is fed between the first roller 11 and the second roller 12, the second surface L2 is coated with the release agent by means of the second coating mechanism 22. The release agent can change the roughness of the second surface L2, so that the lithium ribbon L can adhere to the roller face of the second roller 12 with a small adhesive force, so as to reduce the difficulty of separating the lithium ribbon L from the second roller 12 when the lithium ribbon L turns between the second roller 12 and the third roller 13 to facilitate smooth bonding of the lithium ribbon L on the electrode plate P.

It should be noted that the second surface L2 and the first surface L1 may be coated with a same release agent or different release agents, provided that the lithium ribbon L adheres to the second roller 12 during rolling and the lithium ribbon L is bonded to the electrode plate P during bonding.

According to some embodiments of the present application, the second coating mechanism 22 is located upstream or downstream of the first coating mechanism 21, that is, the second coating mechanism 22 and the first coating mechanism 21 do not simultaneously coating the second surface L2 and the first surface L1 with the release agent in the prelithiation process. For example, when the second coating mechanism 22 is located upstream of the first coating mechanism 21, the lithium ribbon L first passes across the second coating mechanism 22 and then passes across the first coating mechanism 21, that is, the second coating mechanism 22 first coats the second surface L2 of the lithium ribbon L with a release agent, and then the first coating mechanism 21 coats the first surfaces L1 of the lithium ribbon L with a release agent. When the second coating mechanism 22 is located downstream of the first coating mechanism 21, the lithium ribbon L first passes across the first coating mechanism 21 and then passes across the second coating mechanism 22, that is, the first coating mechanism 21 first coats the first surfaces L1 of the lithium ribbon L with a release agent, and then the second coating mechanism 22 coats the second surface L2 of the lithium ribbon L with a release agent. The first coating mechanism 21 and the second coating mechanism 22 are disposed in a staggered mode in the technological process, which achieves rational utilization of the installation space and can prevent interference between components.

Figure 7:
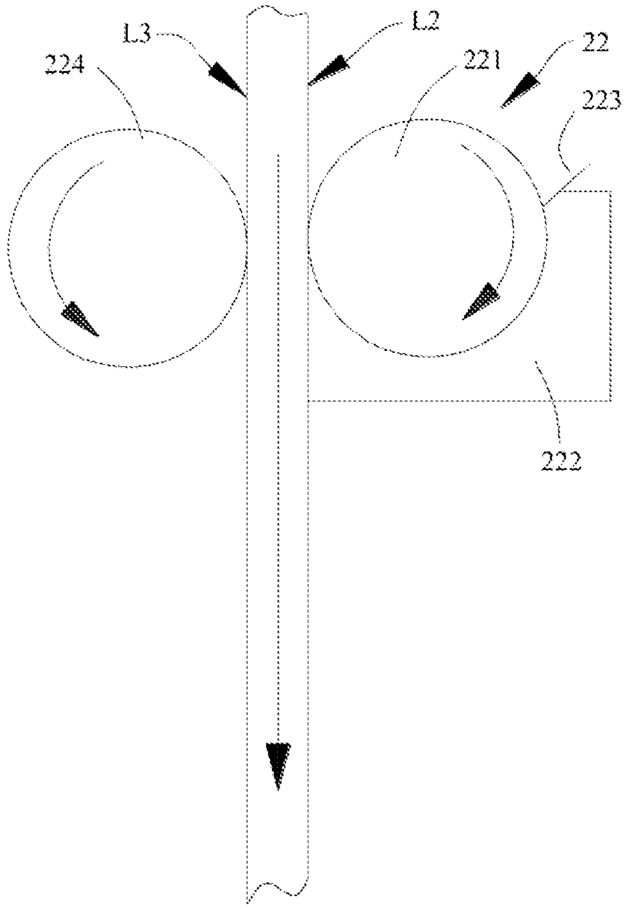
FIG. 7 is a schematic structural diagram of a second coating mechanism when in cooperation with a lithium ribbon according to an embodiment of the present application.

FIG. 7 shows a schematic structural diagram of a second coating mechanism 22 when in cooperation with a lithium ribbon L according to an embodiment of the present application. According to some embodiments of the present application, as shown in FIG. 7, the second coating mechanism 22 comprises a second coating roller 221 and a second trough 222, the second trough 222 being used to receive a release agent, and the second coating roller 221 cooperating with the second trough 222 in a running-fit to coat the second surface L2 with the release agent when the second coating roller 221 rotates. That is, when the second coating roller 221 rotates relative to the second trough 222, the release agent in the second trough 222 is transferred to the roller face of the second coating roller 221, the roller face of the second coating roller 221 comes into contact with the second surface L2, and the second surface L2 is coated with the release agent on the roller face of the second coating roller 221 upon contact. The second coating mechanism 22 coats the second surface L2 of the lithium ribbon L with the release agent by means of transfer coating. The release agent in the second trough 222 is transferred to the second surface L2 through rotation of the second coating roller 221, which achieves flexible coating to ensure uniform coating of the release agent.

In order to control the thickness of the release agent on the second coating roller 221, the second coating mechanism 22 further comprises a second scraper 223, and the second scraper 223 is disposed in the second trough 222. In a direction of rotation of the second coating roller 221, the second coating roller 221 first comes into contact with the release agent in the second trough 222, then the second scraper 223 and the second coating roller 221 cooperatively control the thickness of the release agent on the second coating roller 221, and as the second coating roller 221 rotates, the release agent with the consistent thickness on the second coating roller 221 is transferred to the second surface L2 of the lithium ribbon L.

As shown in FIG. 7, the second coating mechanism 22 further comprises a first back roller 224, the first back roller 224 and the second coating roller 221 being located on two sides of the lithium ribbon L in the thickness direction, and the first back roller 224 being used to cooperate with the second coating roller 221 so as to allow the second coating roller 221 to coat the second surface L2 of the lithium ribbon L with the release agent.

According to some embodiments of the present application, as shown in FIG. 6, the prelithiation device further comprises a detection mechanism 50 and a supplement mechanism 60. The detection mechanism 50 is located downstream of the first coating mechanism 21 and the second coating mechanism 22 and upstream of the second roller 12, and the detection mechanism 50 is used to detect the distribution of the release agent on the lithium ribbon L. The supplement mechanism 60 is used to supplement the release agent to the lithium ribbon L according to the distribution of the release agent on the lithium ribbon L detected by the detection mechanism 50. The cooperation of the detection mechanism 50 and the supplement mechanism 60 can supplement the release agent to the region of the lithium ribbon L lacking the release agent so as to ensure uniform distribution of the release agent on the lithium ribbon L to ensure the coating effect.

It should be noted that the detection mechanism 50 may detect only the distribution of the release agent on the first surfaces L1 of the lithium ribbon L, or may detect only the distribution of the release agent on the second surface L2 of the lithium ribbon L, or may detect the distribution of the release agent on both the first surfaces L1 and the second surface L2. Correspondingly, the supplement mechanism 60 may supplement the release agent only to the first surfaces L1, or may supplement the release agent only to the second surface L2, or may supplement the release agent to both the first surfaces L1 and the second surface L2.

According to some embodiments of the present application, the detection mechanism 50 is used to detect the area of the region of the lithium ribbon L that is not coated with the release agent, and the supplement mechanism 60 is configured to supplement the release agent to the region of the lithium ribbon L that is not coated with the release agent when the detection mechanism 50 detects that the area of the region of the lithium ribbon L that is not coated with the release agent is greater than a preset area. The cooperation of the supplement mechanism 60 and the detection mechanism 50 ensures that the region of the lithium ribbon L that is not coated with the release agent is less than the preset area to alleviate the problem of sticking of the lithium ribbon L to the roller, so that the lithium ribbon L can be bonded to the electrode plate P when the second roller 12 and the third roller 13 roll the electrode plate P.

It should be noted that the detection mechanism 50 may comprise a charge-coupled device (CCD) camera, which is small in size and light in weight, is not affected by a magnetic field, and has strong anti-vibration and anti-impact characteristics. The CCD camera is used to obtain image information of the lithium ribbon L. The supplement mechanism 60 may supplement a release agent by means of spraying, contact coating (sponge dip-coating), etc., which is not limited in the present application.

According to some embodiments of the present application, as shown in FIG. 6, the lithium ribbon L further comprises a third surface L3 (not shown) away from the second roller 12, and the prelithiation device may further comprise a third coating mechanism 23, the third coating mechanism 23 being configured to coat the third surface L3 with a release agent. Coating the third surface L3 with the release agent by means of the third coating mechanism 23 can prevent the lithium ribbon L from adhering to the first roller 11 when the first roller 11 and the second roller 12 roll the lithium ribbon L, and the adhesion of the lithium ribbon L to the second roller 12 is facilitated.

Based on the existence of the second coating mechanism 22 and the third coating mechanism 23, both the second surface L2 and the third surface L3 of the lithium ribbon L can be coated with the release agent, and the second surface L2 and the third surface L3 have different roughness. The adhesive force of the second surface L2 of the lithium ribbon L is generally greater than that of the third surface L3, and after the lithium ribbon L is fed between the first roller 11 and the second roller 12, the lithium ribbon L is more likely to separate from the roller face of the first roller 11 by means of the third surface L3 and smoothly adhere to the roller face of the second roller 12 by means of the second surface L2. In addition, since the release agent is provided on the second surface L2 of the lithium ribbon L, when the lithium ribbon L is fed between the second roller 12 and the third roller 13 and rolled, the lithium ribbon L is more likely to separate from the roller face of the second roller 12 by means of the second surface L2, and comparing the electrode plate P with the roller face of the second roller 12, the surface roughness of the electrode plate P is undoubtedly higher, and thus the lithium ribbon L can be smoothly bonded to the electrode plate P by means of the third surface L3.

When the second coating mechanism 22 and the third coating mechanism 23 are both provided, as shown in FIG. 6, the second coating mechanism 22 and the third coating mechanism 23 may coat the second surface L2 and the third surface L3 of the lithium ribbon L with the release agent at a same position of the lithium ribbon L in a running direction to ensure that the release agent on both sides of the lithium ribbon L in the thickness direction is uniform. It should be noted that, when the second coating mechanism 22 and the third coating mechanism 23 are both provided, the second coating mechanism 22 and the third coating mechanism 23 are disposed opposite each other on two sides of the lithium ribbon L, the second coating mechanism 22 may not be provided with the first back roller 224, and the second coating roller 221 and the third coating mechanism 23 cooperate to respectively coat the second surface L2 and the third surface L3 with the release agent.

It should be noted that the structure of the third coating mechanism 23 may be the same as that of the second coating mechanism 22, and the third coating mechanism 23 is used to coat the third surface L3 of the lithium ribbon L with the release agent. The specific structure of the third coating mechanism 23 will not be described in detail in the present application.

In another embodiment of the present application, when no third coating mechanism 23 is provided, in order to prevent the lithium ribbon L from adhering to the first roller 11, a separator may be arranged between the lithium ribbon L and the first roller 11.

Figure 8:
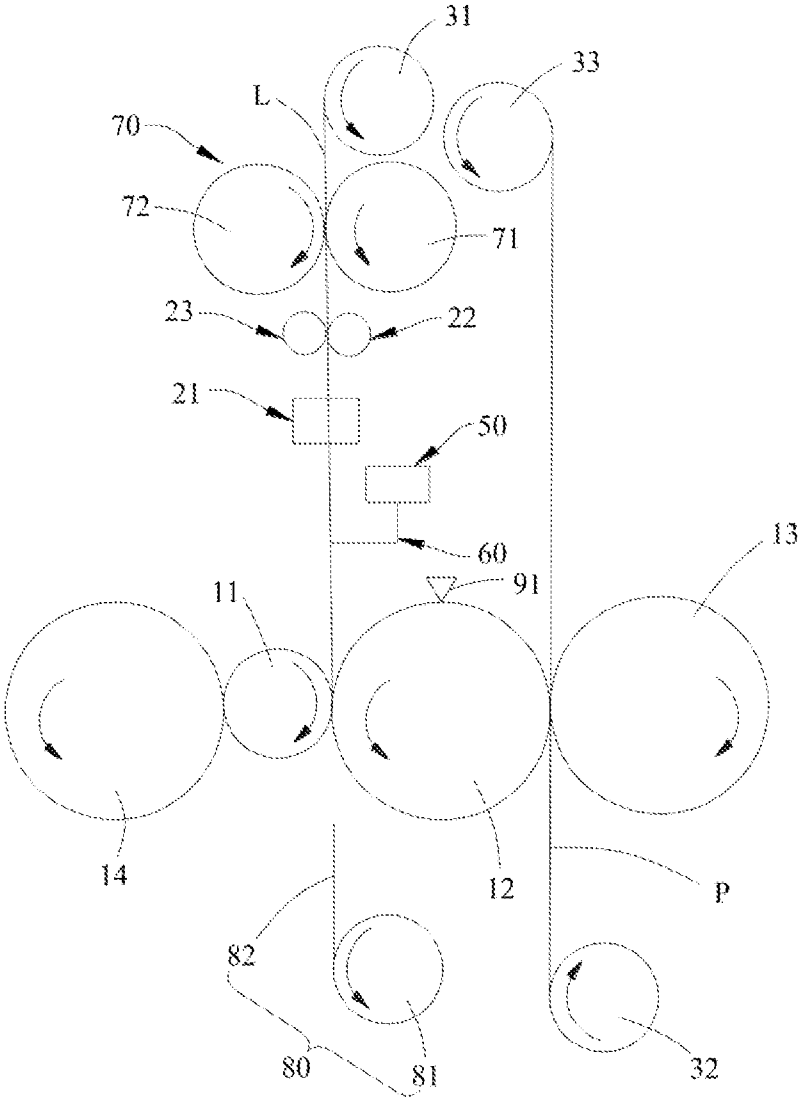
FIG. 8 is a schematic structural diagram of a prelithiation device according to an embodiment of the present application when a lithium ribbon is rolled and bonded.

FIG. 8 shows a schematic structural diagram of a prelithiation device according to an embodiment of the present application when a lithium ribbon L is rolled and bonded. According to some embodiments of the present application, as shown in FIG. 8, the first roller 11 may have a roller diameter less than that of the second roller 12. Different-diameter rolling can be implemented by configuration of large and small roller diameters. Compared with same-diameter rolling, during the different-diameter rolling, the contact area between the second roller 12 and the lithium ribbon L increases, and thus the lithium ribbon L is more likely to adhere to the roller face of the second roller 12. In addition, as the roller diameter of the second roller 12 increases, the contact arc length between the lithium ribbon L and the second roller 12 may increase when the lithium ribbon L is rolled, and thus the lithium ribbon L is not likely to skid at a high speed. In addition, as the roller diameter of the second roller 12 increases, the contact area and contact arc length between the lithium ribbon L and the electrode plate P may increase during bonding, thus improving the adhesion effect between the lithium ribbon L and the electrode plate P. It should be noted that the roller diameter of the first roller 11 refers to the outer diameter of the first roller, and the roller diameter of the second roller 12 refers to the outer diameter of the second roller 12.

Since the first roller 11 has a small roller diameter, the first roller 11 is easily deformed during rolling, which reduces the thickness consistency of rolling. As shown in FIG. 8, the prelithiation device according to the present application further comprises a fourth roller 14, and the fourth roller 14 is disposed opposite the first roller 11 and is located on the side of the first roller 11 that is away from the second roller 12. The fourth roller 14 has a roller diameter greater than that of the first roller 11. The fourth roller 14 and the first roller 11 are in contact with each other and rotate relative to each other, which can reduce the deformation of the first roller 11 during long-term use, improve the thickness consistency of the lithium ribbon L during rolling, and prolong the service life of the device.

Figure 9:
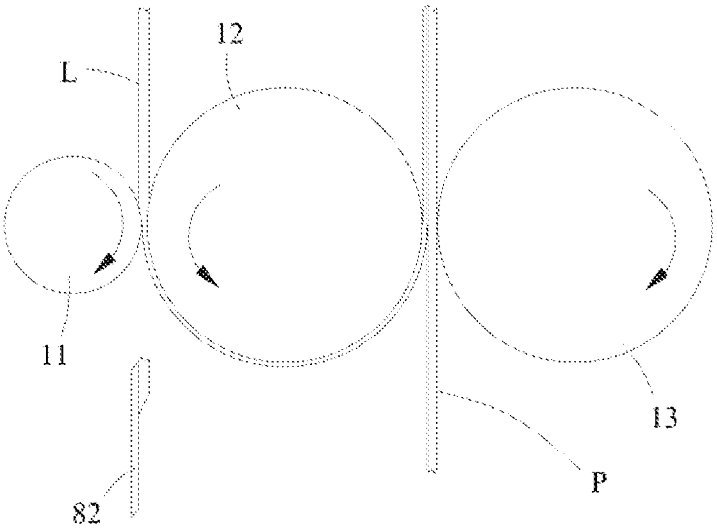
FIG. 9 is a schematic diagram of an operating principle of rolling and bonding for the lithium ribbon in FIG. 8.

FIG. 9 is a schematic diagram of an operating principle of rolling and bonding for the lithium ribbon in FIG. 8. According to some embodiments of the present application, as shown in FIGS. 6, 8 and 9, the prelithiation device further comprises a traction mechanism 80. The traction mechanism 80 comprises a traction roller 81 and a traction belt 82, the traction belt 82 being connected to the traction roller 81. The traction roller 81 is located downstream of the first roller 11 and the second roller 12. The traction roller 81 is a driving roller, and the traction roller 81 is used to wind the traction belt 82. The traction belt 82 is used to pull the lithium ribbon L to enter between the first roller 11 and the second roller 12. When the lithium ribbon L needs to be pulled to run, the traction roller 81 rotates and pulls the traction belt 82 to pass between the first roller 11 and the second roller 12. As the first roller 11 and the second roller 12 rotate, the lithium ribbon L is separated from the first roller 11 and adheres to the roller face of the second roller 12. In addition, the thinned lithium ribbon L adheres to the second roller 12 and is then separated from the traction belt 82.

Figure 10:
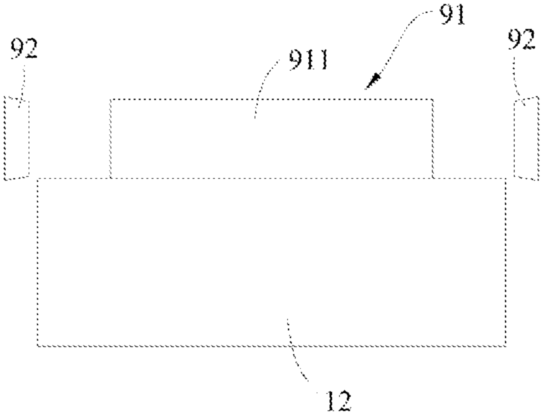
FIG. 10 is a schematic diagram of a scraping mechanism and a dust collection mechanism according to an embodiment of the present application.

FIG. 10 shows a schematic diagram of a scraping mechanism 91 and a dust collection mechanism 92 according to an embodiment of the present application. According to some embodiments of the present application, as shown in FIGS. 8 and 10, the prelithiation device further comprises a scraping mechanism 91 and a dust collection mechanism 92. The first roller 11, the third roller 13 and the scraping mechanism 91 are sequentially arranged in a direction of rotation of the second roller 12, and the scraping mechanism 91 is configured to abut against a roller face of the second roller 12 to remove residual lithium filings and residual release agent on the roller face of the second roller 12 that are not completely transferred to a surface of the electrode plate P. The dust collection mechanism 92 is used to remove the lithium filings and release agent which are scraped off by the scraping mechanism 91. When the second roller 12 rotate, the lithium ribbon L first enters between the first roller 11 and the second roller 12, the lithium ribbon L is thinned, and the thinned lithium ribbon L adheres to the second roller 12. As the second roller 12 rotates, the lithium ribbon L adhering to the second roller 12 rotates between the second roller 12 and the third roller 13, and is bonded to the surface of the electrode plate P; the residual lithium filings and residual release agent, which are not completely transferred to the surface of the electrode plate P, rotate with the second roller 12, and when moving to the scraping mechanism 91, the scraping mechanism 91 removes the residual lithium filings and residual release agent on the roller face of the second roller 12 so as to ensure that the roller face of the second roller 12 is clean; and the clean roller face rotates between the first roller 11 and the second roller 12 to roll the lithium ribbon L. The cooperation of the scraping mechanism 91 and the dust collection mechanism 92 can ensure that the roller face of the second roller 12 is clean, and can also prevent the residual lithium filings and the residual release agent from entering the next step of rolling so as to avoid the safety problems, such as fire, due to the friction between the lithium ribbon L and the residue on the second roller 12, thereby improving the quality of the prelithiation process and improving the safety of battery production.

As shown in FIG. 10, the scraping mechanism 91 comprises a cleaning scraper 911, and a blade of the cleaning scraper 911 abuts against the roller face of the second roller 12. As the second roller 12 rotates, the cleaning scraper 911 moves relative to the second roller 12, and the cleaning scraper 911 can scrape off the residual lithium filings and residual release agent on the roller face of the second roller 12. The dust collection mechanism 92 removes the lithium filings and release agent scraped off by the scraping mechanism 91 under the action of negative pressure, and the dust collection mechanism 92 can recover the lithium filings and release agent scraped off by the scraping mechanism 91, so as to facilitate centralized treatment.

The dust collection mechanism 92 may be a vacuum generator, and the specific type of the vacuum generator is not limited in the embodiment of the present application.

Figure 11:
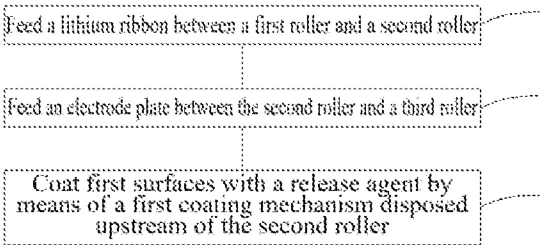
FIG. 11 is a schematic flowchart of a prelithiation method according to an embodiment of the present application.

A prelithiation method provided according to an embodiment of the present application will be described below, and the prelithiation method is implemented using the prelithiation device mentioned above. FIG. 11 shows a schematic flowchart of a prelithiation method according to an embodiment of the present application. As shown in FIG. 11, the prelithiation method comprises:

S01, feeding a lithium ribbon L between a first roller 11 and a second roller 12, and rolling the lithium ribbon L by means of the first roller 11 and the second roller 12 to adhere the lithium ribbon L to the second roller 12, the lithium ribbon L comprising two first surfaces L1 opposite each other in an axial direction of the second roller 12;

S02, feeding an electrode plate P between the second roller 12 and a third roller 13, and rolling the lithium ribbon L by means of the second roller 12 and the third roller 13 to bond the lithium ribbon L adhering to the second roller 12 to the electrode plate P; and S03, coating the first surfaces L1 with a release agent by means of a first coating mechanism 21 disposed upstream of the second roller 12.

In the prelithiation method according to the embodiment of the present application, the first surfaces L1 are coated with the release agent, so that the release agent is provided on the extended portions of the lithium ribbon L after rolling so as to prevent the extended portions of the lithium ribbon L from adhering to the second roller 12 after the lithium ribbon L is bonded to the electrode plate P, which will cause safety risks such as smoking or even fire and result in a poor prelithiation effect and a waste of a lot of lithium, thereby improving the safety of battery production and preventing the waste of lithium.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A prelithiation device comprising:

a first roller;

a second roller for cooperating with the first roller to jointly roll a lithium ribbon (L) to adhere the lithium ribbon (L) to the second roller, the lithium ribbon (L) comprising two first surfaces opposite each other in an axial direction of the second roller;

a third roller for cooperating with the second roller to jointly roll an electrode plate (P) to bond the lithium ribbon adhering to the second roller to the electrode plate; and a first coating roller/trough pair disposed upstream of the second roller and configured to coat the first surfaces (L1) with a release agent;

wherein the lithium ribbon (L) further comprises a second surface facing the second roller, and the prelithiation device further comprises:

a second coating roller/trough pair disposed upstream of the second roller and configured to coat the second surface (L2) with the release agent;

wherein the first coating roller/trough pair and the second coating roller/trough pair are disposed in a staggered manner in a technological process.

2. The prelithiation device according to claim 1, comprising two first coating roller/trough pairs configured to respectively coat the two first surfaces (L1) with the release agent.

3. The prelithiation device according to claim 2, wherein the two first coating roller/trough pairs are disposed opposite each other in the axial direction of the second roller.

4. The prelithiation device according to claim 1, wherein the first coating roller/trough pair comprises a first coating roller and a first trough, the first trough being used to receive the release agent, the first coating roller being provided with a coating recess that is an annular recess circumferentially disposed around the first coating roller, and the first coating roller cooperating with the first trough in a running-fit to coat the first surfaces (L1) with the release agent in the first trough when the first coating roller rotates.

5. The prelithiation device according to claim 1, further comprising:

an adjustment mechanism for adjusting the position of the first coating roller/trough pair in the axial direction of the second roller.

6. The prelithiation device according to claim 1, wherein the second coating roller/trough pair comprises a second coating roller and a second trough, the second trough being used to receive the release agent, and the second coating roller cooperating with the second trough in a running-fit to coat the second surface (L2) with the release agent when the second coating roller rotates.

7. The prelithiation device according to claim 1, wherein the second coating roller/trough pair is located upstream or downstream of the first coating roller/trough pair.

8. The prelithiation device according to claim 1, further comprising:

a detection CCD camera located downstream of the first coating roller/trough pair and the second coating roller/trough pair and upstream of the second roller and used to detect a distribution of the release agent on the lithium ribbon (L); and a supplement mechanism for supplementing the release agent to the lithium ribbon (L) according to the distribution of the release agent on the lithium ribbon (L) detected by the detection CCD camera.

9. The prelithiation device according to claim 8, wherein the detection CCD camera is used to detect an area of the region of the lithium ribbon (L) that is not coated with the release agent, and the supplement mechanism is configured to supplement the release agent to the region of the lithium ribbon (L) that is not coated with the release agent when the detection CCD camera detects that the area of the region of the lithium ribbon (L) that is not coated with the release agent is greater than a preset area.

10. The prelithiation device according to claim 1, further comprising:

a prepressing roller pair disposed upstream of the first coating roller/trough pair.

11. The prelithiation device according to claim 1, further comprising:

a scraper, with the first roller, the third roller and the scraper being sequentially arranged in a direction of rotation of the second roller, and the scraper being configured to abut against a roller face of the second roller to remove residual lithium filings and residual release agent on the roller face of the second roller that are not completely transferred to a surface of the electrode plate (P); and a negative pressure dust collector for removing the lithium filings and the release agent which are scraped off by the scraper.

12. A prelithiation method comprising:

feeding a lithium ribbon (L) between a first roller and a second roller, and rolling the lithium ribbon (L) by means of the first roller and the second roller to adhere the lithium ribbon (L) to the second roller, the lithium ribbon (L) comprising two first surfaces (L1) opposite each other in an axial direction of the second roller;

feeding an electrode plate (P) between the second roller and a third roller, and rolling the lithium ribbon (L) by means of the second roller and the third roller to bond the lithium ribbon (L) adhering to the second roller to the electrode plate (P); and coating the first surfaces (L1) with a release agent by means of a first coating roller/trough pair disposed upstream of the second roller;

wherein the lithium ribbon (L) further comprises a second surface facing the second roller, and the prelithiation method further comprises:

disposing a second coating roller/trough pair upstream of the second roller and using said second coating roller/trough pair to coat the second surface (L2) with the release agent; wherein the first coating roller/trough pair and the second coating roller/trough pair are disposed in a staggered manner in a technological process.

* * * * *